United States Patent [19]

Gulley

[11] 4,313,788
[45] Feb. 2, 1982

[54] PROCESS FOR REDUCING OXYGEN CONSUMPTION IN BLACK LIQUOR OXIDATION

[75] Inventor: Mark R. Gulley, Emmaus, Pa.

[73] Assignee: Air Products and Chemicals, Inc., Allentown, Pa.

[21] Appl. No.: 148,630

[22] Filed: May 12, 1980

[51] Int. Cl.³ .................... D21C 11/10; D21C 11/14
[52] U.S. Cl. .................... 162/31; 159/47 WL; 162/47; 162/51; 210/758; 423/206 R; 423/DIG. 3
[58] Field of Search .................... 162/30 R, 30 K, 21, 162/47, 51, 29; 423/206 R, 207, DIG. 3; 159/47 WL; 210/758, 761

[56] References Cited

U.S. PATENT DOCUMENTS 3,807,479  4/1974  Brannland et al. ........... 159/47 WL
4,239,589  12/1980  Elton et al. ................. 162/31

Primary Examiner—Peter F. Kratz
Attorney, Agent, or Firm—James C. Simmons; E. Eugene Innis

[57] ABSTRACT

High heat recovery and minimized oxygen requirement for oxidation of sulfur compounds in black liquor is obtained by integrating the oxidation into the multiple effect evaporation system of the pulp mill recovery sequence. The oxidation step is carried out at an intermediate stage in the multiple effect concentration of weak black liquor in counterflow to the external heat input, and the thus oxidized liquor is then further concentrated by flow through the remaining effects of the system co-currently with the direction of heat flow.

4 Claims, 3 Drawing Figures

PROCESS FOR REDUCING OXYGEN CONSUMPTION IN BLACK LIQUOR OXIDATION

BACKGROUND OF THE INVENTION

1. Field of the Invention

The present invention relates to improvements in the oxidation of sulfur and compounds thereof contained in black liquor, as practiced in pulp mills for recovery of sulfur values and the elimination of malodorous emissions. The invention is particularly directed to provision of a simplified system designed for recovery of high value energy from the heat evolved in such oxidation reaction, while minimizing the consumption of molecular oxygen utilized for the oxidation.

2. Prior Art

The oxidation of black liquor is currently being employed in the pulping industry and has been described in numerous publications.

In a typical sequence of operation for cellulosic fiber liberation, as in the manufacture of paper products by the kraft pulping process, the raw wood chips or pieces are cooked or digested in a solution of one or more sulfur compounds. Thereafter the mixture of delignified fibers and pulping liquor is sent to a blow tank for pressure reduction, and next transferred to a multiple stage washing facility in which the fibers are separated from the spent chemical-laden wash water filtrate, which filtrate is designated as "weak black liquor". In certain typical plants this black liquor is next subject to concentration in a multiple effect evaporation facility.

Since the spent pulping liquor from the digester contains sodium sulfide and other sulfur compounds which are of themselves malodorous or which form hydrogen sulfide and/or other malodorous sulfur compounds released to the atmosphere during the pulp mill operation, it has become the prevailing practice to subject the sulfur-laden spent pulping liquor to oxidation at some selected stage in the sequence, to convert the sulfide and/or other sulfur compounds therein to more stable compounds such as thiosulfates and/or sulfates.

The point in the mill operation sequence at which the oxidation of this so-called "black liquor" is to be best carried out as well as the manner of carrying out the oxidation step, has been the subject of extensive investigation. Thus, among the various proposals advanced, it has been suggested by some proponents that the oxidation step be applied to the weak black liquor from the washing step and prior to concentration. Drawbacks encountered in this procedure led some mills to resort to previous concentration of the liquor and to subject the obtained "strong black liquor" to the oxidation step. Subsequently, it has been proposed, for example in accordance with U.S. Pat. No. 4,058,433, that oxidation be carried out on the weak black liquor preferably at a point between the outlet of the blow tank and the inlet of the pulp washers, preferably employing oxygen in high concentration as opposed to the more usual use of air for the purpose.

Various types of oxidizing reactors have heretofore been used or proposed for use in the oxidation of black liquor. In U.S. Pat. No. 4,058,433, above-referred to, a long narrow counter-flow reactor column is advocated. Other types of oxidizing vessels and arrangements are depicted in U.S. Pat. Nos. 3,362,868; 3,549,314; 3,709,975; and 3,928,531. In accordance with the disclosure in U.S. Pat. No. 3,709,975 certain of the objections and drawbacks of prior black liquor oxidation processes are stated to be avoided by resort to a multi-stage oxidation technique employing oxygen-rich gas, stated to be applicable to both weak and strong black liquor.

Systems and conditions for black liquor oxidation with molecular oxygen are described by Cooper et al in TAPPI 56, No. 6, June 1973 at pages 100 to 103 and in AIChE Symposium Series, Vol. 69, No. 133 at pp 106–115.

In none of the described techniques of the above-cited patents or other known prior art disclosures and practices of the pulp industry, is there found any description of a black liquor oxidation process particularly aimed at maximizing recovery of energy released in the oxidation reaction. Typically in conventional kraft mill recovery systems which employ air or oxygen black liquor oxidation (BLOX) only a fraction (about 20%) of the heat evolved in the oxidation reaction is recovered as high value energy. The remainder is either lost as vented water vapor or recovered as low value heat in the condenser cooling water.

In a prior pending patent application Ser. No. 947,802, filed Oct. 2, 1978 (now U.S. Pat. No. 4,239,589) operation sequences are described wherein substantially all of the heat liberated in the sulfide oxidation reaction can be recovered. As described in the aforesaid patent application, the sulfide oxidation is integrated with the multiple effect evaporation system operated in reverse flow, and heat recovery is maximized by carrying out the sulfide oxidation preferably on the liquor leaving the #2 effect of the evaporation sequence or alternatively between the #1 effect and the flash tank into which the concentrated liquor is next introduced.

By operation in accordance with the present invention, the high recovery of the heat of sulfide oxidation as achieved by the method of said prior patent application is retained and, in addition thereto, further important benefits and economies in the operation are had including simplification of the process design and minimized oxygen consumption.

SUMMARY OF THE INVENTION

In accordance with the present invention oxidation of the black liquor (BLOX) is carried out at a selected stage during flow of the initially weak liquor through a reverse flow multiple effect evaporation system. It has now been found that important advantages are obtained by effecting oxidation of the liquor leaving the #3 effect, introducing the oxidized liquor into the #1 effect for further concentration, followed by flow of the liquor from the #1 effect to and through the #2 effect.

In the foregoing summary reference is made to "#1 effect", "#2 effect", etc. of a multiple effect evaporator system. It will be understood that the numbering sequence employed is in the direction of steam flow as is conventional in this art. Thus, in a reverse flow multiple effect evaporator system, the initial weak black liquor to be subject to concentration enters the evaporation system at the highest numbered effect while the heating steam is supplied at the opposite end of the sequence to the #1 effect; so that in a six effect system, for example, the initially weak black liquor (WBL) is increasingly concentrated as it flows sequentially from effect #6 towards effect #1.

DETAILED DESCRIPTION

Figure 2:
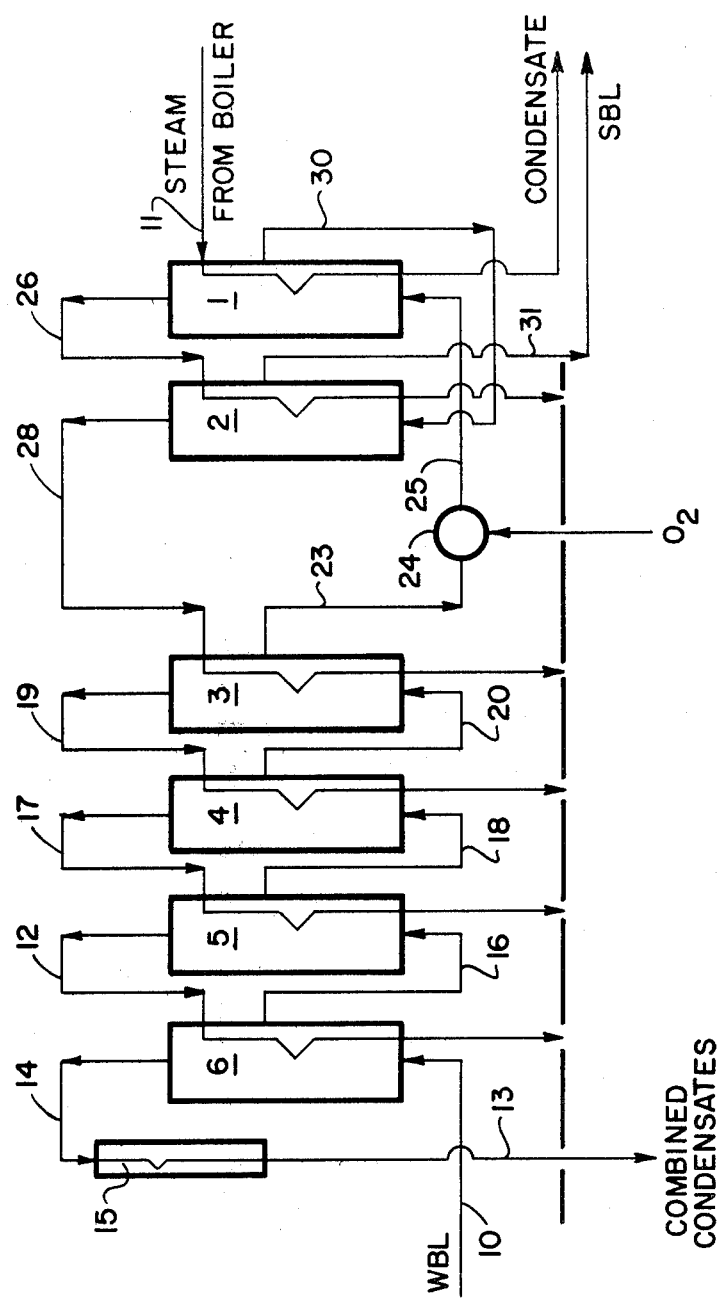
FIG. 2 is a schematic flow diagram of a system for black liquor oxidation in accordance with the present invention.

In FIG. 2 of the drawings, a typical multiple effect evaporator system is schematically depicted as having evaporator effects numbered from #1 to #6. The weak black liquor (WBL) is introduced into the bottom of effect #6 by line 10. If desired, and as is often practiced, the weak black liquor may be simultaneously introduced into effects #6 and #5. Uncontaminated fresh steam from the boiler (not shown) is introduced by line 11, at the opposite end, and passed through the heating coil in effect #1. In effect #6 the liquor is heated by the hot vapor effluent flowing by line 12 from effect #5 into effect #6, with evaporation of at least part of the liquor. The resulting vapors are discharged overhead from effect 190 6 by line 14 into a condenser 15, and are discharged therefrom into a suitable manifold or receiver in which the combined condensates of the evaporator effects are collected.

The condensate formed in line 13 by heat exchange with the liquor in effect #6 is discharged into the combined condensate receiver. The unvaporized heated liquor is discharged from effect #6 by line 16 into the bottom of effect #5 by suitable flow-inducing means (not shown). The evaporation of the liquor and condensation of the introduced vapor in effect #5 and in effects #4 and #3 is the same as that described in effect #6. The liquor from a preceding effect (in the direction of liquid flow) enters effect #4 and #3, respectively, by lines 18 and 20, and the vapor overhead from each of these effects is discharged respectively by lines 17 and 19; the condensate in these lines being discharged to join the combined condensates.

The hot, now partially concentrated liquor, from effect #3 is sent by line 23 into an oxidation reactor 24, which may be of any of the types heretofore employed in the art. As further explained below, a simple single stage oxidation reactor can be employed in practice of the present invention.

The oxidized liquor from reactor 24 is sent directly into effect #1 by line 25, in which effect it is contacted in indirect heat exchange with the steam in line 11. The vapors formed in effect #1 are discharged overhead into line 26 and passed through effect #2. The vapors formed in effect #2 pass by line 28 into effect #3. The unvaporized liquor in effect #1 is discharged through line 30 into the bottom of effect #2. The unvaporized, now concentrated or strong black liquor (SBL), is discharged from effect #2 by line 31 for further treatment and recovery of sulfur values as is customary in the art. Typically, the SBL in line 31 may be sent to a flash tank and the flashed vapors returned to augment the hot vapor in line 28, while the unvaporized liquor from the flash tank may be further treated with oxygen, if required or desired, in a so-called BLOX polishing operation.

The weak black liquor entering effect #6, in a typical operation, will contain about 15% total solids and is brought to about 50% total solids concentration in the multiple effect evaporation system. In practice of the invention, any type of multiple effect evaporator line may be employed as is commonly used by the pulp industry.

For best results in practice of the invention, oxygen gas of high purity should be employed in the oxygenation reactor 24, preferably of not less than 95% $O_2$, the rest of the gas being essentially composed of nitrogen, argon or other inert gases.

For a fuller appreciation of the advantages afforded by the present invention, it is instructive to examine the overall energy and material balances and to compare the oxygen consumption under different operating conditions.

In accordance with the operation described in the aforesaid copending patent application, maximum heat recovery is assured by utilization of the exothermic heat of reaction obtained by oxidation of the partially concentrated black liquor, preferably by introducing the hot oxidized liquor, or the hot vapors flashed therefrom, into the #1 effect of the multiple effect evaporator, in which the black liquor is subjected to the highest temperature for evaporation. It is also important that the oxidized black liquor be introduced into the #1 effect at or above its boiling point for the operating pressure maintained in the #1 effect, in order to avoid the necessity of using the high value energy in additional boiler steam to heat the liquor to its boiling point.

In accordance with the present invention, the process design is simplified and oxygen consumption minimized by oxidizing the black liquor at a lower temperature and at a lower solids concentration than normally obtains in the liquor that leaves the #2 effect. Such lower temperature and lower solids concentration, of course, exist at the liquor exit of each of the higher numbered effects. The full benefits of the invention are accordingly obtained by oxidizing the black liquor in an integrated reverse flow multiple evaporation system prior to the #2 effect, yet selecting the proper point of oxidation such that maximum heat recovery is had. As shown by the calculations below for a typical multiple effect evaporation system, these desired benefits are obtained by oxidizing the liquor leaving the #3 effect, sending the oxidized liquor to the #1 effect and sending the liquor leaving the #1 effect to the #2 effect.

Operation in accordance with the invention avoids excessive oxygen consumption for two reasons:

(a) The initial temperature of the black liquor subjected to oxidation is below that at which oxygen requirements otherwise rise significantly with increasing temperature.

(b) The temperature rise as a result of the oxidation reaction will be smaller because of the lower solids content in the black liquor, which provides more water to absorb the heat of sulfide oxidation.

In preferred operation of the invention, the oxidation is carried out on the liquor leaving the #3 effect, at which point the liquor will be at a temperature of about 203° F. (95° C.).

The calculations below confirm that the oxidation of the partially concentrated black liquor leaving the #3 effect obtains a desired temperature equal to or greater than the existing liquor temperature in the #1 effect. On the other hand, if such oxidation is carried out on the liquor leaving the #4 effect, the temperature gain as a result of heat released in the oxidation reaction is insufficient to enable feeding the oxidized liquor directly to the #1 effect. In the case of oxidizing the black liquor (BL) leaving the #2 effect as taught in the aforesaid prior patent application, the temperature increases from the oxidation reaction is more than sufficient to enable feeding the liquor to the #1 effect. This achieved higher temperature, provides no benefit from the standpoint of useful heat recovery or savings in oxygen consumption.

Black liquor at any solids concentration contains sulfur in at least two reduced forms, sodium sulfide ($Na_2S$) and sodium polysulfide ($Na_2S_x$). If no sodium polysulfide were present in solution, the theoretical oxygen requirement for thiosulfate formation would be 1 mol $O_2$/mol $Na_2S$. The stoichiometric oxygen requirement (SOR) for the oxidation of sodium sulfide and sodium polysulfide present in the feed is that amount of oxygen needed for conversion of the $Na_2$ to thiosulfate plus the additional oxygen required for like conversion of the zero valent sulfur of the polysulfide. Thus:

$$SOR = C_S + (C_p/2)$$

where $C_S$ is mol/L [$Na_2S$]+[$Na_2S_x$], and $C_p$ is mol/L zero valent sulfur in $Na_2S_x$.

While it has been the common practice in the prior art to consider only the removal of sodium sulfide as the measure of reactor performance, consideration of the total sulfur in the black liquor (SOR), it is believed, provides a more reliable basis for process design. The calculations in the present application, accordingly, are based on the total sulfur in the feed expressed in terms of stoichiometric oxygen requirement (SOR).

A pilot plant study under actual kraft mill operating conditions was conducted in order to accomplish the following:
1. Substantiate the technical and economic benefits for integrating black liquor oxidation into the multiple effect evaporation system in order to achieve high recovery of useful energy from the heat of reaction.
2. Provide experimental data for comparison of alternative process flow schemes for such systems.
3. Determine the optimal flow scheme based on process economics, such economics being dependent on oxygen consumption.

Figure 1:
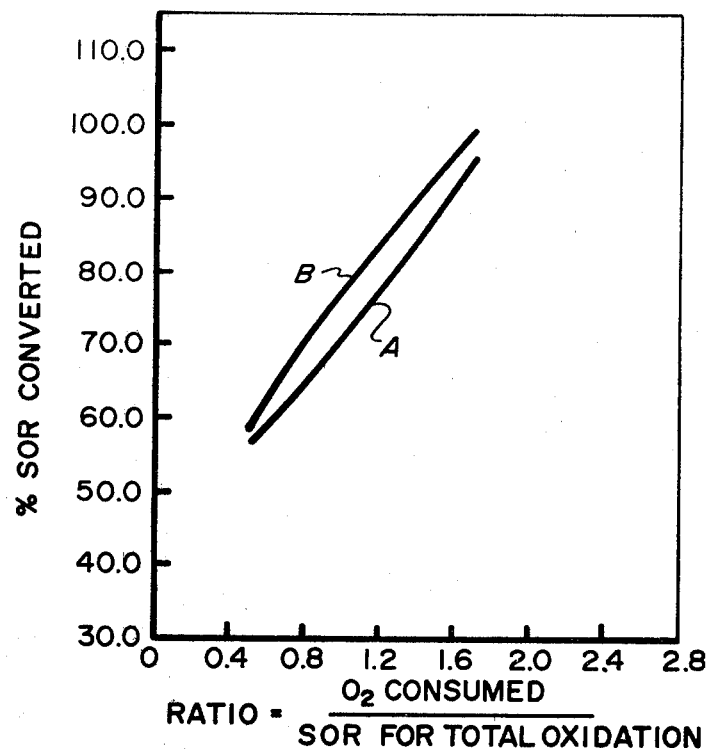
FIG. 1 is a plot showing the relation between the relative amount of oxygen consumed versus the percent of the total sulfur content converted in the black liquor feed.

In FIG. 1 of the accompanying drawings there is plotted the percent of total sulfur (SOR) converted with increasing relative amounts of oxygen consumed. The amount of oxygen is expressed in terms of the ratio of actual oxygen consumption to the theoretical amount of oxygen required for total conversion of contained sulfur to thiosulfate. The actual consumption is based on a number of pilot plant runs. Curve A is based on pilot plant data for oxidation of the partially concentrated black liquor exiting from the #2 effect and curve B for that of the liquor from the #3 effect, of a six stage multiple effect evaporator system.

The basis for the calculations set out below is given in Table 1.

TABLE 1

| BASIS FOR CALCULATIONS | |
|---|---|
| Pulp Production Rate (MTPD) | 1,000 |
| Solids Loading (Kg BLS/MT) | 1,500 |
| Solids Flow Rate (Kg BLS/hr) | 62,500 |
| Evaporator Steam Requirement (Kcal/MT) | 776,000 |
| Power Consumption for $O_2$ production (KWH/MT $O_2$) | 500 |

| | EFFECT | | |
|---|---|---|---|
| | #2 | #3 | #4 |
| Solids Level (%)[3] | 35.0 | 26.0 | 21.2 |

TABLE 1-continued

| BASIS FOR CALCULATIONS | |
|---|---|
| Pulp Production Rate (MTPD) | 1,000 |
| Solids Loading (Kg BLS/MT) | 1,500 |
| Solids Flow Rate (Kg BLS/hr) | 62,500 |
| Evaporator Steam Requirement (Kcal/MT) | 776,000 |
| Power Consumption for $O_2$ production (KWH/MT $O_2$) | 500 |

| | EFFECT | | |
|---|---|---|---|
| | #2 | #3 | #4 |
| Black Liquor Flow Rate (Kg/hr)[3] | 178,571 | 240,384 | 294,811 |
| Initial Black Liquor Temperature (°C.)[3] | 107 | 95 | 83 |
| Initial Sulfide Concentration (mole SOR/L)[1] | 0.300 | 0.210 | 0.164 |
| Oxygen Consumption @ 95% Oxidation Conversion[1] (mole $O_2$/mole SOR) | 1.68 | 1.55 | [2] |
| Enthalpy of Oxidation Reaction (Kcal/gm - mole $O_2$)[1] | 87 | 87 | [2] |
| Specific Heat (Kcal/Kg -°C.)[4] | 0.830 | 0.875 | 0.900 |
| Specific Gravity[4] | 1.20 | 1.13 | 1.09 |

[1]Data from pilot plant study.
[2]Black liquor from #4 effect was not oxidized as part of pilot plant study.
[3]McDonald, R. G., Pulp and Paper Manufacture, 2d ed., 1969, Vol. I: The Pulping of Wood, page 573
[4]McDonald op. cit page 506.
MT = metric ton
PD = per day
BLS = black liquor solids The process design objective was to achieve 95% SOR oxidative conversion of sulfur in the black liquor, while minimizing oxygen consumption and minimizing evaporator steam requirement in the multiple effect evaporator system.

From the regression equations leading to the plot in FIG. 1, the kilograms of oxygen, consumed per metric ton of pulp leaving effect #2 and effect #3, respectively, are as follows (at 95% conversion):

Effect #2

$$1.68 \frac{\text{mole } O_2}{\text{mole SOR}} \times \frac{0.3 \text{ mole SOR}}{L} \times \frac{178,571 \text{ Kg BL}}{\text{hr}} \times$$

$$\frac{1}{1.2 \text{ s.g.}} \times \frac{24 \text{ hr.}}{\text{day}} \times \frac{32 \text{ gm}}{\text{mole } O_2} \times \frac{MT}{10^6 \text{ gm}} =$$

$$57.6 \text{ MTPD } O_2$$

$$57.6 \frac{Kg O_2}{MT \text{ pulp}}$$

Effect #3

$$1.55 \frac{\text{mole } O_2}{\text{mole SOR}} \times \frac{0.21 \text{ mole SOR}}{L} \times \frac{240,384 \text{ Kg BL}}{\text{hr}} \times$$

$$\frac{1}{1.13 \text{ s.g.}} \times \frac{24 \text{ hr.}}{\text{day}} \times \frac{32 \text{ gm } O_2}{\text{mole } O_2} \times \frac{MT}{10^6 \text{ gm}} =$$

$$53.2 \text{ MTPD } O_2$$

$$53.2 \frac{Kg O_2}{MT \text{ pulp}}$$

Figure 3:
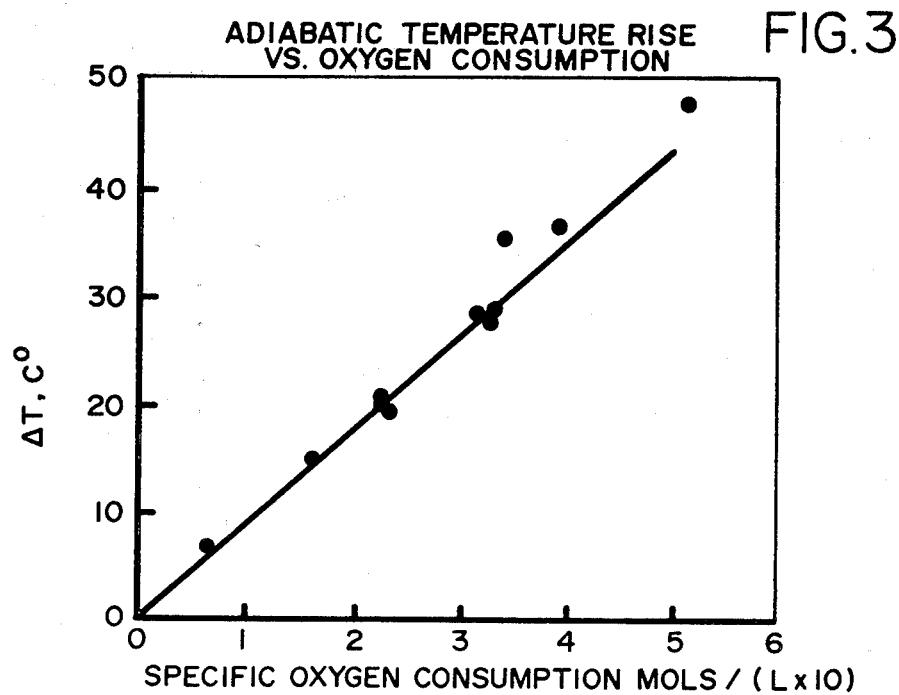
FIG. 3 is a plot of the adiabatic temperature rise as a function of the specific oxygen consumption.

FIG. 3 is a plot of the specific oxygen consumption (in moles/liter × 10), with relation to the adiabatic temperature increase (T) in °C. The plotted abscissa values are derived from those in Equations (I) and (II), thus:

$$\frac{1.68 \text{ mole } O_2}{(\text{mole SOR})} \times \frac{0.3 \text{ (mole SOR)}}{\text{L-BL}} =$$

$$\frac{1.68 \times 0.3 \text{ mole } O_2}{\text{L BL}} = \frac{5.04 \text{ Mole } O_2}{\text{L-BL} \times 10}$$

$$\frac{1.55 \text{ mole } O_2}{(\text{mole SOR})} \times \frac{0.21 \text{ (mole SOR)}}{\text{L BL}} =$$

$$\frac{1.55 \times 0.21 \text{ mole } O_2}{\text{L BL}} = \frac{3.255 \text{ Mole } O_2}{\text{L BL} \times 10}$$

The temperature rise in effects #2 and #3, respectively is calculated as follows:

Temperature Rise (See FIG. 3.)
Liquor from #2 effect $$1.68 \frac{\text{mole } O_2}{\text{mole SOR}} \times \frac{0.3 \text{ mole SOR}}{\text{L-BL}} \times \frac{87 \text{ Kcal}}{\text{mole } O_2} \times \quad (III)$$

$$\frac{1}{1.2 \text{ s.g.}} \times \frac{\text{Kg- }°\text{C.}}{0.83 \text{ Kcal}} = \underline{44° \text{ C.}}$$

initial temperature + increase in temperature = final temperature 107° C. + 44° C. = 151° C. Temperature increase is more than sufficient by 29° C. (151° C.−122° C.) to enable feeding oxidized #2 effect black liquor to the #1 effect.

Liquor from #3 effect $$1.55 \frac{\text{mole } O_2}{\text{mole SOR}} \times \frac{0.21 \text{ mole SOR}}{\text{L BL}} \times \frac{87 \text{ Kcal}}{\text{mole } O_2} \times \quad (IV)$$

$$\frac{1}{1.13 \text{ s.g.}} \times \frac{\text{Kg- }°\text{C.}}{.875 \text{ Kcal}} = \underline{29° \text{ C.}}$$

$$95° \text{ C.} + 29° \text{ C.} = \underline{124° \text{ C.}}$$

Temperature increase is just sufficient to enable feeding oxidized #3 effect black liquor to the #1 effect.

The scope of pilot plant work did not include evaluation of oxidation of #4 effect black liquor. Therefore, oxygen consumption data for oxidation of #4 effect black liqour is not available. However, based on the observation that oxygen consumption decreased from #2 effect to #3 effect black liquor (1.68 to 1.55 mole $O_2$/mole SOR) and based also on the findings reported in the literature that oxygen consumption decreased as reaction temperature decreased, it is likely to expect that oxygen consumption for oxidation of #4 effect black liquor would be less than 1.55 mole $O_2$/mole SOR/.

Nevertheless, it will be conservatively assumed that oxygen consumption for oxidation of #4 effect black liquor is 1.55 mole $O_2$/mole SOR solely for the purpose of estimating temperature rise for oxidation of #4 effect liquor.

4 effect $$1.55 \frac{\text{mole } O_2}{\text{mole SOR}} \times \frac{0.165 \text{ mole SOR}}{\text{L}} \times \frac{87 \text{ Kcal}}{\text{mole } O_2} \times$$

$$\frac{1}{1.09 \text{ s.g.}} \times \frac{\text{Kg- }°\text{C.}}{0.90 \text{ Kcal}} = \underline{23° \text{ C.}}$$

$$83° \text{ C.} + 23° \text{ C.} = \underline{106° \text{ C.}}$$

Temperature increase is insufficient by 16° C. (122° C.−106° C.) to enable feeding oxidized #4 effect black liquor to the #1 effect.

The increase in evaporator steam required would be:

$$16° \text{ C.} \times \frac{.900 \text{ Kcal}}{\text{Kg- }°\text{C.}} \times \frac{294,811 \text{ Kg B.L.}}{\text{hr}} \times \frac{24 \text{ hr.}}{\text{day}} \times$$

$$\frac{\text{day}}{1000 \text{ MT pulp}} = 101,900 \frac{\text{Kcal}}{\text{MT pulp}}$$

to raise the oxidized #4 effect black liquor to the normal operating temperature in the #1 effect. This would represent a 13% increase (101,900/776,000) in evaporator steam.

The overall results in oxidizing the black liquor exiting from effects #2, #3 and #4, respectively, is summarized in Table 2 below:

TABLE 2

| | EFFECT NO. | | |
|---|---|---|---|
| | #2 | #3 | #4 |
| Oxygen Consumption (MTPD $O_2$) or (Kg $O_2$/MT pulp) | 57.6 | 53.2 | (1) |
| Temperature Rise (°C.) | 44 | 29 | 21 |
| Temperature Difference (°C.)(2) | 29 | 2 | (minus 16) |

(1)Oxygen consumption was not calculated for oxidation of #4 effect black liquor.
(2)Temperature difference is that between the final temperature of the oxidized black liquor and the normal operating temperature in the #1 effect.

The power savings resulting from oxidizing the BL leaving #3 effect versus that leaving the #2 effect is determined as follows:

$$57.6 \frac{\text{K}_g O_2}{\text{MT pulp}} - 53.2 \frac{\text{K}_g O_2}{\text{MT pulp}} = 4.4 \frac{\text{K}_g O_2}{\text{MT pulp}}$$

$$4.4 \frac{\text{K}_g O_2}{\text{MT pulp}} \times \frac{500 \text{ KWH}}{\text{MT } O_2} \times \frac{\text{MT}}{1000 \text{ Kg}} = 2.2 \frac{\text{KWH}}{\text{MT pulp}}$$

This represents a 7.6% savings in power requirements when operating in accordance with the preferred process of the present invention. The economic benefits based on a conservative estimated average power cost of four cents per kilowatt hour, at a plant capacity of 1000 MT pulp per day, this amounts to a saving of:
2.2 × 0.04 × 1000 × 350 = $30,800 per year In addition to the foregoing, there are additional prospective savings in construction and operation costs. To control oxygen consumption at the higher operating temperatures at the #2 effect exit or after #1 effect, a multi-stage reactor design may be needed, since the heat released in oxidation of the contained sulfur will increase substantially the temperature of the black liquor at the higher solids level prevailing in the lower numbered effects (i.e. lower than #3). To help control the oxygen consumption (part of which, at the higher temperature prevailing, may be used up due to reaction with lignin), the heat of reaction and consequent temperature elevation can be reduced somewhat by flashing steam. By operation at the lower temperatures made possible in accordance with the present invention the need for a multi-stage reactor design is eliminated with a consequent decrease in capital investment for reactors and auxiliary components. Moreover, to control temperature in a multi-stage oxidizing reactor, the extent of fractional conversion of sulfur contained in the liquor at each stage needs to be determined. By operating in accordance with the present invention and employing a single stage oxygenation reactor, the operation is considerably simplified.

Having thus described my invention what is desired to be secured by Letters Patent is set out in the following claims:

1. In the oxidation of black liquor obtained from wood pulping with sulfur-containing compounds in a system employing multiple effect evaporation utilizing reverse flow of the liquor up to effect #3 for concentration of such liquor and wherein the heat evolved in the oxidation reaction is utilized to reduce the external heat requirement for concentration of the initially weak black liquor charged to such evaporation system, the improvement which comprises withdrawing the partly concentrated liquor exiting from the #3 effect of said multi-effect evaporation system, oxidizing the withdrawn liquor by contact with a gas stream containing molecular oxygen, with consequent temperature elevation as a result of the heat of the oxidation reaction; introducing the oxidized liquor directly into the #1 effect of such evaporation system wherein it is further concentrated by heating above its boiling point by extraneous heat introduced into said #1 effect, thereby producing a heated liquor and a vapor portion; discharging the heated liquor from said #1 effect into the #2 effect, heating the liquor in said #2 effect by the vapor portion discharged overhead from the #1 effect, and discharging the concentrated and oxidized black liquor from said #2 effect.

2. The improvement as defined in claim 1 wherein the oxidation of the black liquor is effected over the temperature range of about 95 to about 124° C.

3. The improvement as defined in claim 1 wherein the oxidation of the black liquor is effected at reaction conditions effecting a temperature elevation of about 29° C.

4. The method as defined in claim 1 wherein the partly concentrated black liquor is subjected to said oxidation at an initial temperature of about 95° C. and the oxidation reaction is carried out with oxygen gas of high purity under conditions resulting in a temperature increase of the liquor in the order of about 29° C.

* * * * *